United States Patent
Dutta et al.

[19]

[11] Patent Number: 5,953,319
[45] Date of Patent: Sep. 14, 1999

[54] WIDE AREA MOBILE COMMUNICATION NETWORKS WITH MULTIPLE ROUTING MODE OPTIONS

[75] Inventors: Santanu Dutta, Cedar Rapids; David W. Best; Dennis W. Sutherland, both of Marion; Thomas A. Trebs, Hiawatha, all of Iowa

[73] Assignee: AMSC Subsidiary Corporation, Reston, Va.

[21] Appl. No.: 08/536,719

[22] Filed: Sep. 29, 1995

[51] Int. Cl.⁶ .................................. H04J 1/06; H04B 7/00
[52] U.S. Cl. .......................... 370/238; 370/316; 370/349; 370/401
[58] Field of Search ...................... 370/238, 237, 370/316, 323, 349, 430, 437, 340, 327, 341, 360, 315, 328, 329, 343, 465, 480, 352, 353, 354, 355, 401; 379/93, 94, 221, 59, 60; 455/11.1, 12.1, 54.1, 53.1, 33.1; 340/825.03

[56] References Cited

U.S. PATENT DOCUMENTS

| | | | |
|---|---|---|---|
| 5,258,995 | 11/1993 | Su et al. ................................. | 375/206 |
| 5,289,536 | 2/1994 | Hokari .................................... | 370/360 |
| 5,345,600 | 9/1994 | Davidson ................................ | 370/437 |
| 5,481,537 | 1/1996 | Crisler et al. .......................... | 370/437 |
| 5,490,284 | 2/1996 | Itoh et al. .............................. | 455/11.1 |
| 5,583,913 | 12/1996 | Taketsugu ............................... | 370/349 |
| 5,592,469 | 1/1997 | Szabo ..................................... | 370/342 |
| 5,615,213 | 3/1997 | Griefer ................................... | 370/412 |
| 5,619,528 | 4/1997 | Rebec et al. .......................... | 375/219 |

Primary Examiner—Chau Nguyen
Assistant Examiner—Soon-Dong Hyun
Attorney, Agent, or Firm—Irah H. Donner; Pepper Hamilton LLP

[57] ABSTRACT

A packet switched multi-mode mobile communication network and fixed and mobile devices for use therewith are disclosed. Each of the mobile vehicle equipment and a base station packet switch are coupled to respective data terminal equipment which generates packet data messages. The packet data messages have message characteristics associated therewith. Each of the mobile vehicle equipment and the base station packet switch have an intelligent switching node incorporated therein for selecting which of a plurality of radio frequency transmission paths to use in transmitting the packet data message to the other of the mobile vehicle equipment and the base station packet switch. Each of the plurality of radio frequency transmission paths has transmission path characteristics associated therewith. The intelligent switching nodes select the radio frequency transmission path as a function of the message characteristics of the packet data message and as a function of the transmission path characteristics of the plurality of radio frequency transmission paths.

10 Claims, 5 Drawing Sheets

WIDE AREA MOBILE COMMUNICATION NETWORKS WITH MULTIPLE ROUTING MODE OPTIONS

BACKGROUND OF THE INVENTION

The present invention relates to mobile vehicle packet data communication networks, and more particularly, to a mobile vehicle packet data communication network having multiple routing mode options and providing intelligent control thereof.

Mobile data networks can be classified into two major categories—circuit switched and packet switched. In circuit switched networks, an end-to-end "physical" connection is set up for the duration of the call and physical assets of the network are dedicated to the particular call for its duration. This does not preclude the case of call hand off, as performed in cellular networks, where the physical path may be switched during the call.

In packet data networks, an end-to-end connection is also set up for the duration of the call, but the connection is "logical", not physical. A logical connection merely establishes the routing of packets through a multiplicity of switching nodes within the network, the path being determined by source and destination addresses of the packets. It is not necessary to dedicate to the call a specific physical path for the entire call duration—packets with different source and destination addresses, following different logical paths, are time multiplexed on the links within the network.

Mobile packet data networks in existence today use exclusively a satellite transmission path or exclusively a terrestrial transmission path. An example of a commercial satellite packet data network is Inmarsat-C. An example of a commercial terrestrial packet data network is ARDIS. Cellular-type networks, including networks in both the common-carrier cellular bands and the Specialized Mobile Radio (SMR) bands, currently offer packet data services in addition to voice telephone services. Satellite transmission is characterized by large coverage footprints, whereas terrestrial mobile communication is usually of the cellular type and involves relatively small coverage cells with hand-off between cells.

Networks which are capable of using only one transmission medium or transmission path, such as a terrestrial transmission path or a satellite transmission path, require that tradeoffs be made between the advantages and disadvantages of each medium. For example, satellite transmission offers the advantage of wide coverage area owing to the large footprints of its beams. However, some of its major disadvantages are weak received signals, on the ground and at the satellite, and long transmission delays because of great propagation distances. In addition, satellite network infrastructure costs tend to be higher than their terrestrial counterparts.

In contrast, terrestrial transmission involves strong received signals, at the mobile terminal and at the base stations, and short delays owing to much shorter propagation distances. This simplifies receiver design and reduces mobile transmit power. In addition, the cost of terrestrial transmission, on a per mobile terminal basis, is typically lower than that of satellite transmission. It would be preferable for a packet data network to be able to take advantage of the best features of multiple transmission paths (i.e., of satellite and terrestrial transmission paths). However, no "multi-mode" packet data networks with this feature are believed to be available or to have been disclosed in the literature.

Disclosures have been made in the open literature regarding conceptual approaches for integrating "circuit-switched" mobile satellite communications and "circuit switched" cellular communications to provide "multi-mode" circuit switched communications. Thus, the advantages of both circuit switched satellite communication sub-networks and of circuit switched cellular communication sub-networks could in theory be combined. However, it is believed that no multi-mode circuit switched communication networks are commercially available. This is likely due, at least in part, to several difficult requirements that are inherent in multi-mode circuit switched networks.

All of the multi-mode systems discussed in the literature, relating to circuit switched networks, require direct connection between a terrestrial Mobile Telephone Switching Office (MTSO), also referred to as Mobile Switching Center (MSC), and a satellite base station, also referred to as satellite hub station (SHS). In other words, they require that a direct link be established between the two transmission path sub-networks which provide the multiple routing mode options. The direct link between the MTSO and the SHS is required for two reasons. First, because of the circuit switched nature of the application (voice telephony), a direct physical path must exist, end-to-end through the network, for the duration of the call. Second, because the public switched telephone networks (PSTN) cannot be modified easily, the mode switching must be performed outside the PSTN, such as in the MTSO and/or in the SHS. In other words, the switching must be performed inside of the two communication transmission path sub-networks—an undesirable requirement in most instances.

In addition to requiring a direct link between the MTSO and SHS sub-networks, modifications are required to the existing software of the MTSO and the SHS because the satellite and terrestrial transmission characteristics are sufficiently different that unmodified terrestrial hand off protocols cannot be used. These sub-network requirements and/or necessary modifications are undesirable and render many satellite and terrestrial sub-networks unusable as transmission paths in the circuit switched multi-mode communications networks described in the literature.

Consequently, a need exists for a multi-mode communication network which eliminates the undesirable requirements of the circuit switched multi-mode networks discussed in the literature, especially when circuit switching is not essential, while providing users with a wider coverage area, reduced costs, and a variety of data transmission rates and message delivery times. No disclosures have appeared in the open literature, nor are there any practical examples of, multi-mode packet switched networks.

SUMMARY OF THE INVENTION

It is an object of the present invention to provide a multi-mode mobile communication network which provides users with a wide coverage area. It is a further object of the present invention to provide a multi-mode mobile communication network which provides users with a variety of transmission costs, data transmission rates and/or message delivery times. The present invention achieves these and other objects discussed throughout this application.

A packet switched multi-mode mobile communication network and fixed and mobile devices for use therewith are disclosed. Each of the mobile vehicle equipment and a base station packet switch are coupled to respective data terminal equipment which generates packet data messages. The packet data messages have message characteristics associated therewith. Each of the mobile vehicle equipment and the base station packet switch have an intelligent switching node incorporated therein for selecting which of a plurality of radio frequency transmission paths to use in transmitting the packet data message to the other of the mobile vehicle equipment and the base station packet switch. Each of the plurality of radio frequency transmission paths has transmission path characteristics associated therewith. The intelligent switching nodes select the radio frequency transmission path as a function of the message characteristics of the packet data message and as a function of the transmission path characteristics of the plurality of radio frequency transmission paths.

BRIEF DESCRIPTION OF THE DRAWINGS

The invention may be more fully understood by reading the following description of a preferred embodiment of the invention in conjunction with the appended drawings wherein.

DETAILED DESCRIPTION OF THE PREFERRED EMBODIMENTS

The present invention is a packet switched multi-mode wide area mobile communication network, synthesized from a multiplicity of single-mode packet switched sub-networks, and used in conjunction with fixed and mobile end user devices. The wide area mobile communication network employs mobile vehicle equipment and a base station packet switch, each of which includes an intelligent switching node, to control access to multiple radio frequency transmission paths. Each of the multiple radio frequency transmission paths is provided by an independent wide area communication sub-network. This mobile communications approach is unique in that it allows the combination of features and capabilities of a wide range of communication path sub-network services into an integrated network service which appears to the users to be provided by a single communications network.

The present invention is based in part upon the recognition that packet data networks offer certain degrees of freedom in implementation over circuit switched networks. This freedom was utilized in the present invention to realize advantages not available in the art. In a packet data network, mode switching may be performed externally from the communication path sub-networks, as is discussed below in greater detail with reference to FIGS. 2 and 3. A packet switch is added at the fixed-user access point to the sub-networks to route traffic to and from the multiplicity of sub-networks. At the mobile terminal, mode switching is performed by a multi-mode radio transceiver and switching logic, which is usually microprocessor based. The multi-mode transceiver may be a single transceiver capable of tuning across multiple radio frequency bands and communicating using multiple protocols, or a multiplicity of transceivers each operating in parallel in multiple bands.

This external switching of the present invention offers the advantage of avoiding modifications to existing sub-networks, some of which may be of the public type and therefore not easily modifiable. In contrast to proposed circuit switched multi-mode networks, in packet switching, packets may be routed via either sub-network without the knowledge or involvement of the other sub-network. Packets can then be reassembled at their destination in the correct order, irrespective of their medium of delivery.

In a preferred embodiment of the present invention discussed below in greater detail, of the two sub-networks used, ARDIS is of the common-carrier type and was not open to modifications. The Inmarsat-C mobile satellite sub-network, although owned by the applicant's organization, would have been expensive and time consuming to modify. The present approach of external switching allowed the multi-mode network to be synthesized quickly and at lower cost than would be possible if the switching were performed within either sub-network, such as by interconnecting the terrestrial base stations and the satellite hub stations, as suggested in the contemporaneous art.

Figure 1:
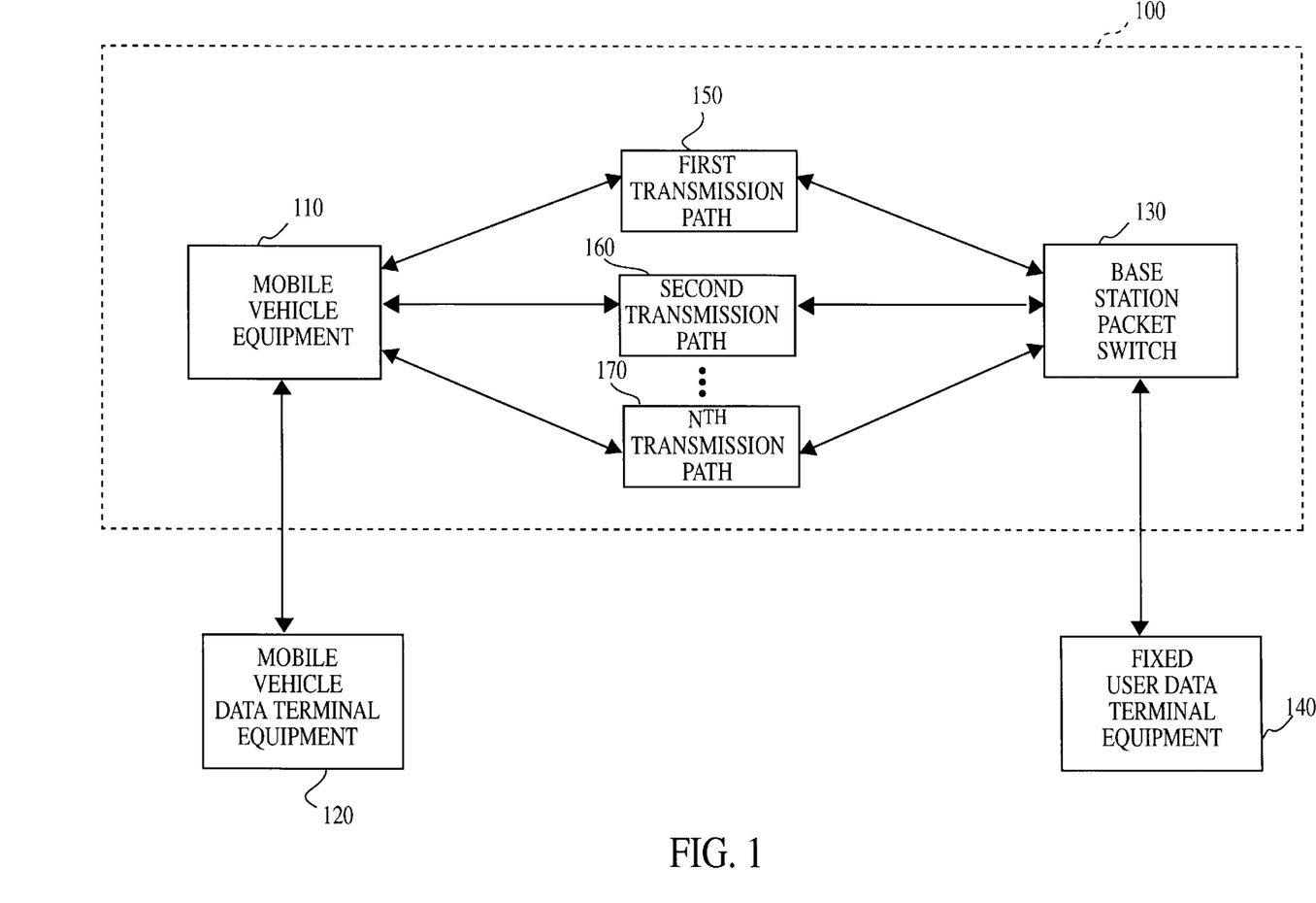
FIG. 1 is a block diagram illustrating a wireless packet data transmission network for communicating with mobile terrestrial vehicles in accordance with preferred embodiments of the present invention.

FIG. 1 is a block diagram illustrating wireless data transmission network 100, in accordance with preferred embodiments of the present invention, for communicating with mobile terrestrial vehicles. Network 100 is a multi-mode packet data network which includes mobile vehicle equipment 110, base station packet switch 130, and multiple radio frequency transmission paths (only first transmission path 150, second transmission path 160 and Nth transmission path 170 are shown). Mobile vehicle data terminal equipment 120 and fixed user data terminal equipment 140 are the end user equipment of this multi-mode network. It must be noted that in the preferred embodiment, the multiple radio frequency transmission paths are not necessarily provided as part of the present invention, but rather, they are simply leased sub-networks for use with or in the present invention to facilitate mobile communications in the manner described.

Mobile vehicle equipment 110 is a terrestrial vehicle based device or system which facilitates communication between mobile vehicle data terminal equipment 120, located on board the mobile vehicle, and fixed user data terminal equipment 140, through base station packet switch 130. Mobile vehicle equipment 110 can be selectively coupled to any of the multiple radio frequency transmission paths for establishing a "logical" communication link with base station packet switch 130. Mobile vehicle equipment 110 incorporates "intelligent" routing and control mechanisms to determine which of the radio frequency transmission paths a particular message data packet will be delivered through. A preferred embodiment of mobile vehicle equipment 110 is discussed in greater detail with reference to FIG. 2.

Mobile vehicle data terminal equipment 120 is coupled to mobile vehicle equipment 110 and can be any of a variety of devices which exchange information with equipment 110 for transmission/reception to/from fixed user data terminal equipment 140. For example, mobile vehicle data terminal equipment 120 can be other computer based systems, sensors and/or human interface devices.

Base station packet switch 130 performs a routing function similar to mobile vehicle equipment 110, but is positioned at a fixed location. Base station packet switch 130 can be selectively coupled to any of the multiple radio frequency transmission paths for sending packet data messages to, and receiving packet data messages from, mobile vehicle equipment 110. Base station packet switch 130 incorporates intelligent routing and control mechanisms to control which of the multiple radio frequency transmission paths a particular packet data message will be transmitted through. A preferred embodiment of base station packet switch 130 is discussed in greater detail with reference to FIG. 3.

Fixed user data terminal equipment 140 is coupled to base station packet switch 130 and can be any of a variety of devices which exchange information with base station packet switch 130 for transmission/reception to/from mobile vehicle data terminal equipment 120. For example, data terminal equipment 140 can be other computer based systems such as a management information system (MIS) and/or data terminal equipment 140 can be human interface devices.

Radio frequency transmission paths 150, 160 and 170 are typically different wide area communication sub-networks available from any of a number of service providers. The radio frequency transmission paths are therefore typically independent and self-sufficient sub-networks having no inter-network communication links between one another. There are at least two transmission paths, typically with at least one being a satellite-based sub-network and at least one being a terrestrial-based sub-network. For example, in the preferred embodiment, first radio frequency transmission path 150 is provided by the American Mobile Satellite Corporation's (AMSC) Inmarsat-C satellite sub-network. In this embodiment, the mobile-satellite communication sub-network utilizes geostationary satellites operating in the L-band of the radio spectrum. Second radio frequency transmission path 160 is preferably a terrestrial based sub-network such as the one provided by the ARDIS Special Mobile Radio (SMR) sub-network. Other transmission paths can be used in addition to the ARDIS and AMSC (or Inmarsat-C) sub-networks. For example, cellular phone and low earth orbit (LEO) sub-networks can be used as transmission paths in the present invention as well. Further, the sub-networks need not be wide-area in coverage. They can be specialized local area coverage networks.

As discussed above, a number of wide area mobile communication sub-networks are in operation in the United States and in other countries. As a transmission path, each sub-network has characteristics which provide certain advantages over other sub-networks. Satellite-based sub-networks have the highly desirable characteristic of ubiquitous coverage for many areas, particularly for rural areas of the North American continent. However, satellite-based sub-networks frequently experience blockages in urban coverage areas. Further, the signal strength of satellite-based sub-networks is low. Also, satellite equipment costs and data transmission costs are higher than those of their terrestrial counterparts.

As transmission paths, terrestrial-based sub-networks frequently offer practically full coverage in urban areas, the coverage area in which satellite sub-networks frequently experience blockages. Terrestrial-based sub-networks such as ARDIS can even provide in-building reception by mobile vehicle equipment 110. Further, terrestrial-based sub-networks provide advantages over satellite-based sub-networks in that signal strength is higher, data transmission rates are typically higher, the costs of sending data messages are lower, and the costs of equipment are lower. However, while terrestrial-based sub-networks continue to grow in coverage, the coverage remains concentrated in metropolitan areas with major gaps existing in rural areas.

In preferred embodiments of the present invention, one or more of the differentiating characteristic features of coverage, signal strength, data rates, message delivery times and data costs are used as factors which allow mobile vehicle equipment 110 and base station packet switch 130 to select the most appropriate one of radio frequency transmission paths 150, 160 and 170. Realizing the complimentary nature of satellite and terrestrial-based sub-networks, the "multi-mode" system of the present invention offers users the benefits of ubiquitous satellite coverage and the high data rates and in-building penetration capabilities of a terrestrial system.

Figure 2:
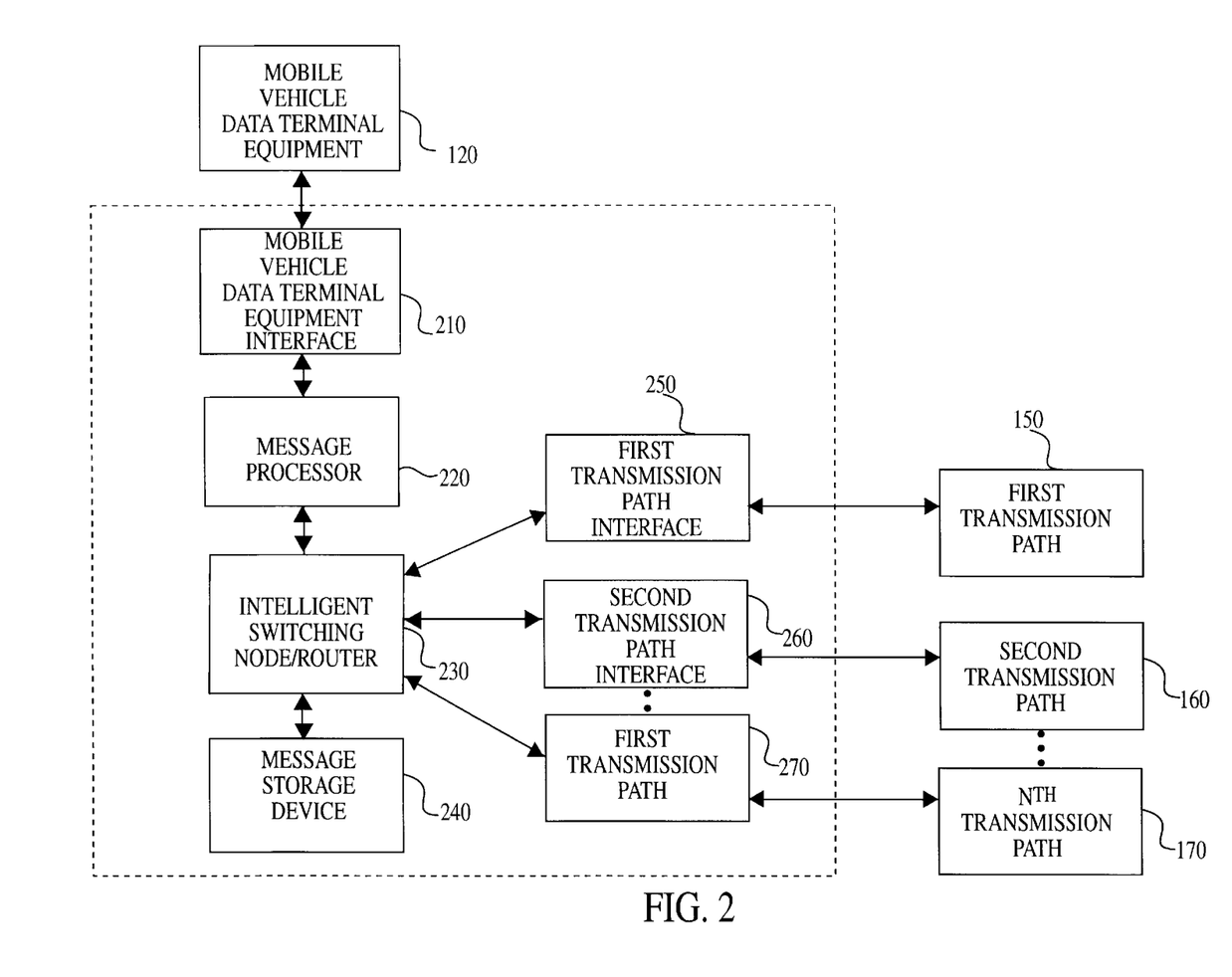
FIG. 2 is a block diagram of portions of the network shown in FIG. 1 which illustrates the mobile vehicle equipment in greater detail.

FIG. 2 is a block diagram of portions of network 100 shown in FIG. 1, which illustrates mobile vehicle equipment 110 in greater detail. Mobile vehicle equipment 110 includes mobile vehicle data terminal equipment interface 210, message processor 220, intelligent switching node or router 230, message storage device 240, and multiple transmission path interfaces (only first transmission path interface 250, second transmission path interface 260 and Nth transmission path interface 270 are shown).

In preferred embodiments, mobile vehicle data terminal equipment interface 210 is coupled between mobile vehicle data terminal equipment 120 and message processor 220. Message processor 220 is coupled between mobile vehicle data terminal equipment interface 210 and intelligent switching node 230. Message storage device 240 is coupled to intelligent switching node 230 as well. Finally, intelligent switching node 230 can be selectively coupled, through respective ones of transmission path interfaces 250, 260 and 270, to desired ones of transmission paths 150, 160 and 170.

Mobile vehicle data terminal equipment interface 210 is a device which provides an interface between mobile vehicle data terminal equipment 120 and the rest of mobile vehicle equipment 110. Mobile vehicle data terminal equipment interface 210 is typically a circuit card or device having analog and/or digital circuitry adapted to convert information from mobile vehicle equipment 110 into a format usable by mobile vehicle data terminal equipment 120, and vice versa.

Message processor 220 is a device which serves as an interface between mobile vehicle data terminal interface 210 and intelligent switching node 230. Message processor 220 interprets and acts upon information sent and received by mobile vehicle data terminal equipment interface 210, which includes messages transmitted and received, commands to control various operating modes, and queries for information on message status, operating modes and overall health of the system. Message processor 220 passes information to be transmitted together with control information, such as designation of preferred transmission path, criticality of delivery timing or other constraints regarding the method of information delivery, to intelligent switching node 230. Likewise, information received by intelligent switching node 230 from the multiple transmission paths is passed to message processor 220 for interpretation in the case of control information or delivery to mobile vehicle data terminal equipment interface 210 in the case of data.

Figure 4:
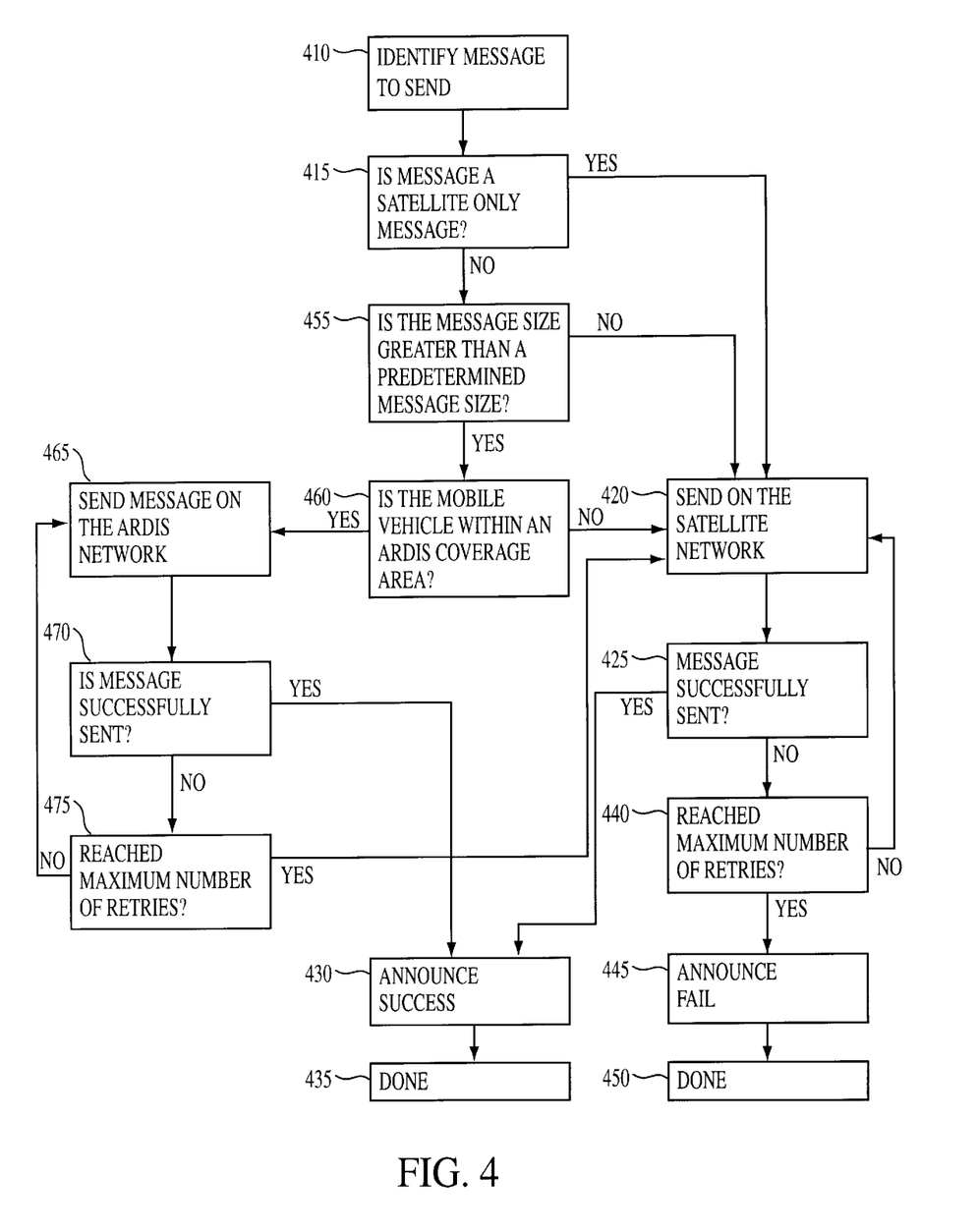
FIG. 4 is a flow diagram illustrating one preferred method used by the intelligent switching nodes of the present invention to determine which of two or more transmission paths to utilize when transmitting a particular message data packet.

Intelligent switching node 230 is preferably a microprocessor based device or system which intelligently routes messages, intended for transmission to base station packet switch 130 (not shown in FIG. 2) through a respective one of transmission path interfaces 250, 260 and 270 to a corresponding desired one of transmission paths 150, 160 and 170. The flow diagram illustrated in FIG. 4 illustrates one preferred method by which intelligent switching node 230 determines which transmission path to utilize for transmitting a particular message data packet in order to obtain some desired result such as lowest transmission cost or fastest transmission delivery. Also, intelligent switching node 230 receives messages, through a particular one of interfaces 250, 260 and 270 and transmitted over the corresponding one of transmission paths 150, 160 and 170, transmitted by base station packet switch 130.

Message storage device 240 can be any storage device capable of storing copies of message data packets for possible re-transmission. For example, message storage device 240 can be an electronic storage device such as a dynamic random access memory (DRAM) integrated circuit for temporarily storing received or transmitted message data packets. A primary function of message storage device 240 is to store a copy of a message data packet which equipment 110 is attempting to send over a first one of the transmission paths. If the message is not successfully sent due to reasons such as unavailability of the first transmission path sub-network, the copy stored in message storage device 240 can be used to re-send the message over the first one of the transmission paths or over a second one of the transmission paths.

Transmission path interfaces 250, 260 and 270 are devices which couple intelligent switching node 230 to corresponding ones of transmission paths 150, 160 and 170. For example, in embodiments in which transmission first path 150 is a satellite-based sub-network, first transmission path interface 250 is preferably a satellite modem. In some embodiments, first transmission path interface 250 is a satellite modem adapted for using the INMARSAT-C protocol for roaming through the spot-beam patterns of the MSAT-1 satellite. In preferred embodiments in which second transmission path 160 is provided by the ARDIS sub-network, second transmission path interface 260 is preferably a Motorola RPM-405i packet data modem. This modem handles the ARDIS sub-network protocol and roaming between the terrestrial sub-network coverage areas.

Figure 3:
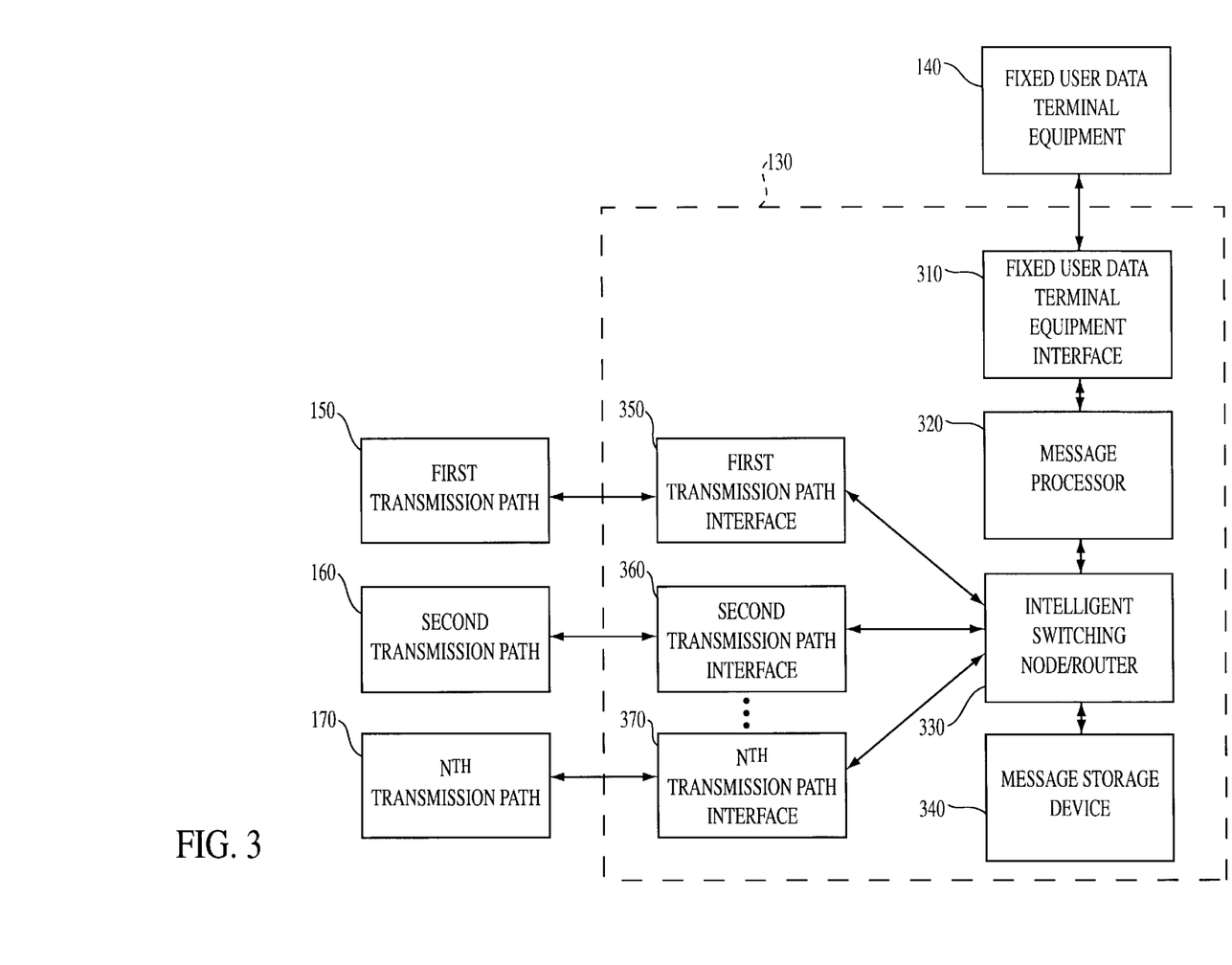
FIG. 3 is a block diagram of portions of the network shown in FIG. 1 which illustrates the base station packet switch in greater detail.

FIG. 3 is a block diagram of portions of network 100 shown in FIG. 1 which illustrates base station packet switch 130 in greater detail. Base station packet switch 130 includes fixed data terminal equipment interface 310, message processor 320, intelligent switching node or router 330, message storage device 340, and multiple transmission path interfaces (only first transmission path interface 350, second transmission path interface 360 and Nth transmission path interface 370 are shown).

In preferred embodiments, fixed data terminal equipment interface 310 is coupled between fixed user data terminal equipment 140 and message processor 320. Message processor 320 is coupled between fixed data terminal equipment interface 310 and intelligent switching node 330. Message storage device 340 is coupled to intelligent switching node 330 as well. Finally, intelligent switching node 330 can be selectively coupled, through respective ones of transmission path interfaces 350, 360 and 370, to desired ones of transmission paths 150, 160 and 170.

Fixed data terminal equipment interface 310 is a device which provides an interface between fixed user data terminal equipment 140 and the rest of base station packet switch 130. Fixed data terminal equipment interface 310 is typically a circuit card or device having analog and/or digital circuitry adapted to convert information from base station packet switch 130 into a format usable by fixed user data terminal equipment 140, and vice versa.

Message processor 320 is a device which serves as an interface between fixed data terminal interface 310 and intelligent switching node 330. Message processor 320 interprets and acts upon information sent and received by fixed data terminal equipment interface 310, which includes messages transmitted and received, commands to control various operating modes, and queries for information on message status, operating modes and overall health of the system. Message processor 320 passes information to be transmitted together with control information, such as designation of preferred transmission path, criticality of delivery timing or other constraints regarding the method of information delivery, to intelligent switching node 330. Likewise, information received by intelligent switching node 330 from the multiple transmission paths is passed to message processor 320 for interpretation in the case of control information or delivery to fixed data terminal equipment interface 310 in the case of data.

Intelligent switching node 330 is preferably a microprocessor based device or system which intelligently routes messages, intended for transmission to mobile vehicle equipment 110 (not shown in FIG. 3) through a respective one of transmission path interfaces 350, 360 and 370 to a corresponding desired one of transmission paths 150, 160 and 170. The flow diagram illustrated in FIG. 4 illustrates one preferred method by which intelligent switching node 330 determines which transmission path to utilize for transmitting a particular message data packet in order to obtain some desired result such as lowest transmission cost or fastest transmission delivery. Also, intelligent switching node 330 receives messages, through a particular one of interfaces 350, 360 and 370 and transmitted over the corresponding one of transmission paths 150, 160 and 170, transmitted by mobile vehicle equipment 110.

Message storage device 340 can be any storage device capable of storing copies of message data packets for possible re-transmission. For example, message storage device 340 can be an electronic or magnetic data storage device adapted for temporarily storing received or transmitted message data packets. A primary function of message storage device 340 is to store a copy of a message data packet which packet switch 130 is attempting to send over a first one of the transmission paths. If the message is not successfully sent due to reasons such as unavailability of the first transmission path sub-network, the copy stored in message storage device 340 can be used to re-send the message over the first transmission path or over a second one of the transmission paths.

Transmission path interfaces 350, 360 and 370 are devices which couple intelligent switching node 330 to corresponding ones of transmission paths 150, 160 and 170. For example, in embodiments in which first transmission path 150 is a satellite-based sub-network, first transmission path interface 350 is preferably an interface to a satellite hub station. In some embodiments, the satellite hub station uses the Inmarsat-C protocol adapted for roaming through the spot beam patterns of the MSAT-1 satellite. In preferred embodiments in which second transmission path 160 is provided by the ARDIS sub-network, second transmission path interface 360 is preferably an interface to a hub of the ARDIS sub-network. This interface provides communication with the ARDIS sub-network.

FIG. 4 is a flow diagram illustrating one preferred method employed by either or both of intelligent switching nodes 230 and 330 of mobile vehicle equipment 110 and base station packet switch 130 to determine which of two or more transmission paths to utilize when transmitting a particular message data packet. The method of FIG. 4 assumes that two transmission paths, one provided by a satellite sub-network (e.g., first transmission path 150) and one provided by the ARDIS terrestrial sub-network (e.g., second transmission path 160), are available for use by the mobile terrestrial vehicle communication network of the present invention. However, it must be noted that additional sub-networks can be added as alternate transmission paths.

According to the method of the present invention, a message to be sent from one data terminal to the other is identified in step 410. Identifying the message generally includes a recognition of the message characteristics associated with the message. At first decision point 415, the intelligent switching node (either 230 or 330) of the sending equipment (either mobile vehicle equipment 110 or base station packet switch 130) determines whether the message is of a type which should be sent by satellite sub-network only (e.g., via transmission path 150). If the message is of the satellite only type, the switching node uses, in step 420, the appropriate transmission path interface (i.e., 250 or 350) to send the message across corresponding satellite-based sub-network transmission path 150.

While an attempt at sending a particular message data packet over satellite sub-network transmission path 150 is being made, a copy of the message is stored in the sending equipment's message storage device (i.e., message storage device 240 or 340). A determination as to whether the message has been successfully sent is made in step 425. If the message is successfully sent, in step 430, the corresponding human interface equipment notifies the sender of the successful transmission and the process is completed (step 435). If the message is not successfully sent, the copy stored in the message storage device is used to retransmit the message over the satellite sub-network. After some predetermined maximum number of retries, as determined in step 440, if the message data packet has not been successfully sent due to reasons such as blockages in the satellite sub-network coverage, the sender is notified of the failed attempt (in step 445) and the process terminates (step 450).

At decision point 415, if the message is not a satellite only message, the intelligent switching node of the sending equipment determines (at decision point 455) whether the message size is greater than a predetermined message size. The predetermined message size is determined as a function of the costs versus message size of using the various sub-networks. In order to keep costs down, messages greater than some predetermined size are preferably sent using the terrestrial-based ARDIS network. If the message size is less than the predetermined maximum, the message is sent over the satellite sub-network in the manner discussed above. If the message size is greater than the predetermined maximum, the intelligent switching node uses decision point 460 to determine which transmission path to select.

In decision point 460, the sending intelligent switching node determines whether the mobile vehicle is within an ARDIS coverage area. One of the ways this may be performed is by comparing position reports from the mobile vehicle with a stored data base in base station packet-switch 130. It is also possible to bypass decision point 460, if it is not feasible or preferable to perform the data base comparison described above. In that case, it is assumed that the exit status of decision point 460 is always "yes", and the message is sent over the ARDIS network, as indicated by block 465 in FIG. 4.

If the mobile vehicle is not within an ARDIS coverage area, the message is sent on satellite sub-network transmission path 150 in the manner discussed above. If the mobile vehicle is within the ARDIS coverage area, attempts are made (step 465) to send the message on ARDIS sub-network transmission path 160. The sending switching node then uses the appropriate transmission path interface (i.e., 260 or 360) to send the message across corresponding terrestrial-based ARDIS sub-network transmission path 160.

While an attempt at sending the message data packet over the ARDIS sub-network is being made, a copy of the message is stored in the sending equipment's message storage device (i.e., message storage device 240 or 340). If the message is successfully sent (as determined in step 470), the associated human interface equipment notifies the sender (in step 430) of the successful transmission. If the message is not successfully sent, the copy stored in the message storage device is used to re-transmit the message over the ARDIS sub-network. After some predetermined maximum number of retries, as determined in step 475, if the message data packet has not been successfully sent due to reasons such as the mobile vehicle being out of range of the ARDIS coverage areas, the intelligent switching node sends the message over satellite sub-network transmission path 150 in the manner discussed above.

Figure 5:
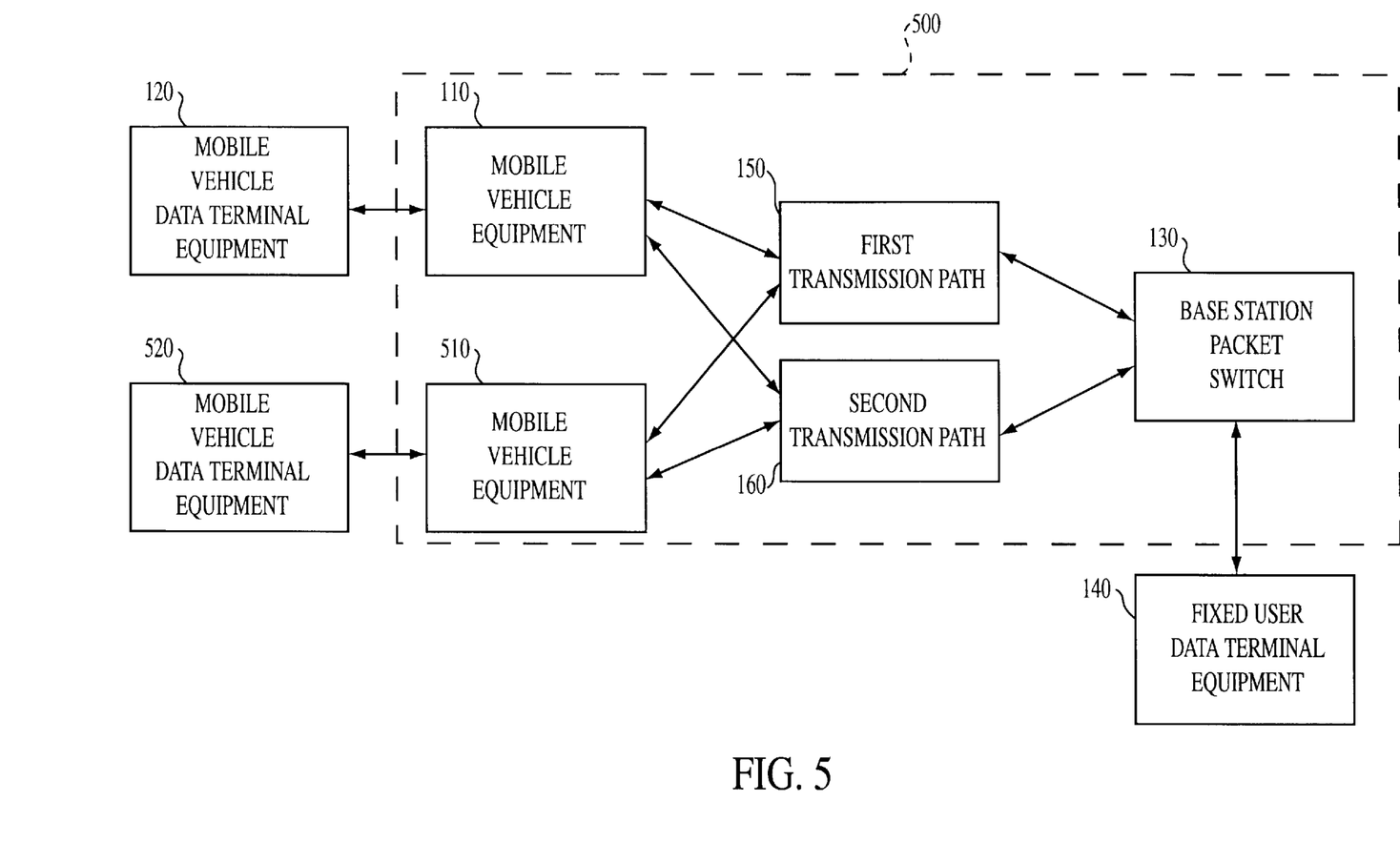
FIG. 5 is a block diagram illustrating a wireless packet data transmission network for communicating between two mobile vehicles and for broadcasting packet data messages from a base station packet switch to multiple mobile vehicles simultaneously.

FIG. 5 is a block diagram illustrating a wireless packet data transmission network for communicating between two mobile vehicles and/or for broadcast communications from a base station packet switch to multiple mobile vehicles simultaneously. Network 500 is identical to network 100 illustrated in FIG. 1 with the exception that network 500 includes mobile vehicle equipment 510 and mobile vehicle data terminal equipment 520 which are positioned on a second mobile vehicle. Also, for ease of discussion, only transmission paths 150 and 160 are shown in FIG. 5. Mobile vehicle equipment 510 and mobile vehicle data terminal equipment 520 are coupled together and are similar or identical to mobile vehicle equipment 110 and mobile vehicle data terminal equipment 120 discussed with reference to FIGS. 1 and 2. Network 500 provides mobile-to-mobile and/or broadcast communications as follows.

As illustrated in FIG. 5, the present invention provides communication between mobile vehicle equipment 110 and mobile vehicle equipment 510. In this mode of operation, message data packets (generated by the associated data terminal 120) transmitted from mobile vehicle equipment 110 are coded with destination address information which identifies them to base station packet switch 130 for delivery to mobile vehicle equipment 510, and ultimately to data terminal equipment 520. Data packets are transmitted from mobile vehicle equipment 110 to base station packet switch 130 through one of the available transmission paths using the means described above. When data packets of this type are received by base station packet switch 130, they are sent to the destination mobile vehicle equipment 520 through an available transmission path using the methods described above with reference to FIGS. 1–4.

FIG. 5 also illustrates the capability of the current invention to provide communication between fixed user data terminal equipment 140 and mobile vehicle equipment on a multiplicity of vehicles, two of which are shown in the figure (110 and 510). In this mode of operation, message data packets transmitted from fixed data terminal equipment 140 to base station packet switch 130 are coded with destination address information which identifies them to base station packet switch 130 for delivery to both mobile vehicle equipment 110 and 510. Data packets are transmitted from base station packet switch 130 to mobile vehicle equipment 110 and 510 through one or more of transmission paths as selected by the methods described above. This results in each message data packet transmitted from fixed data terminal equipment 140 being received by the mobile vehicle equipment of two or more vehicles.

While particular embodiments of the present invention have been shown and described, it should be clear that changes and modifications may be made to such embodiments without departing from the true scope and spirit of the invention. It is intended that the appended claims cover these and other such changes and modifications.

We claim:

1. A packet switched mobile communication device for use on a terrestrial vehicle for communicating with a fixed communication device through a base station packet switch, the mobile communication device comprising:

means for generating a packet data message for transmission to the fixed communication device using one of a plurality of radio frequency transmission paths, the packet data message having message characteristics associated therewith, each of the plurality of radio frequency transmission paths having transmission path characteristics associated therewith; and an intelligent switching node located outside of the plurality of radio frequency transmission paths and coupled to the means for generating a packet data message, wherein the intelligent switching node selects, as a function of the message characteristics of the packet data message and as a function of the transmission path characteristics of each of the plurality of radio frequency transmission paths, a preferred one of the plurality of radio frequency transmission paths to be used for transmitting the packet data message to the fixed communication device.

2. The mobile communication device of claim 1, wherein the plurality of radio frequency transmission paths are provided by independent and self-sufficient sub-networks, wherein independent and self-sufficient sub-networks are sub-networks having no inter-network communication links between the sub-networks.

3. The mobile communication device of claim 2, wherein one of the plurality of radio frequency transmission paths is a mobile-satellite communication sub-network.

4. The mobile communication device of claim 3, wherein the mobile-satellite communication sub-network utilizes geostationary satellites operating in the L-band of the radio spectrum.

5. The mobile communication device of claim 2, wherein one of the plurality of radio frequency transmission paths is a terrestrial mobile communication sub-network.

6. The mobile communication device of claim 5, wherein the terrestrial mobile communication sub-network is a Specialized Mobile Radio (SMR) network utilizing UHF-band groundwave propagation.

7. The mobile communication device of claim 1, wherein a transmission path characteristic, associated with each of the plurality of transmission paths, is a coverage area in which individual transmission paths are available for use in transmitting the packet data message to the fixed communication device.

8. The mobile communication device of claim 1, wherein one of the message characteristics associated with the packet data message is a size of the packet data message.

9. The mobile communication device of claim 1, wherein one transmission path characteristic associated with each of the plurality of transmission paths is a cost of delivery of the packet data message on each of individual transmission path.

10. A wireless packet switched data transmission network for communicating with a mobile terrestrial vehicle, the wireless packet switched data transmission network comprising:

a first radio frequency transmission path having transmission path characteristics associated therewith;

a second radio frequency transmission path having transmission path characteristics associated therewith; and a mobile vehicle radio and a base station packet switch, the mobile vehicle radio being positioned on the mobile terrestrial vehicle, wherein each of the mobile vehicle radio and the base station packet switch include:

means for generating a packet data message, the packet data message having data message characteristics associated therewith; and an intelligent switching node coupled to the means for generating the packet data message, the intelligent switching node being located outside of the first and second radio frequency transmission paths, the intelligent switching node selecting which of the first and second transmission paths to use in sending the packet data message from one of the mobile vehicle radio and the base station packet switch to the other of the mobile vehicle radio and the base station packet switch, the intelligent switching node selecting which of the first and second transmission paths to use as a function of the transmission path characteristics associated with the first and second radio frequency transmission paths and as a function of the data message characteristics.

* * * * *